No. 803,565. PATENTED NOV. 7, 1905.
A. DINA.
MECHANICAL MOVEMENT.
APPLICATION FILED NOV. 25. 1904.
2 SHEETS—SHEET 1.
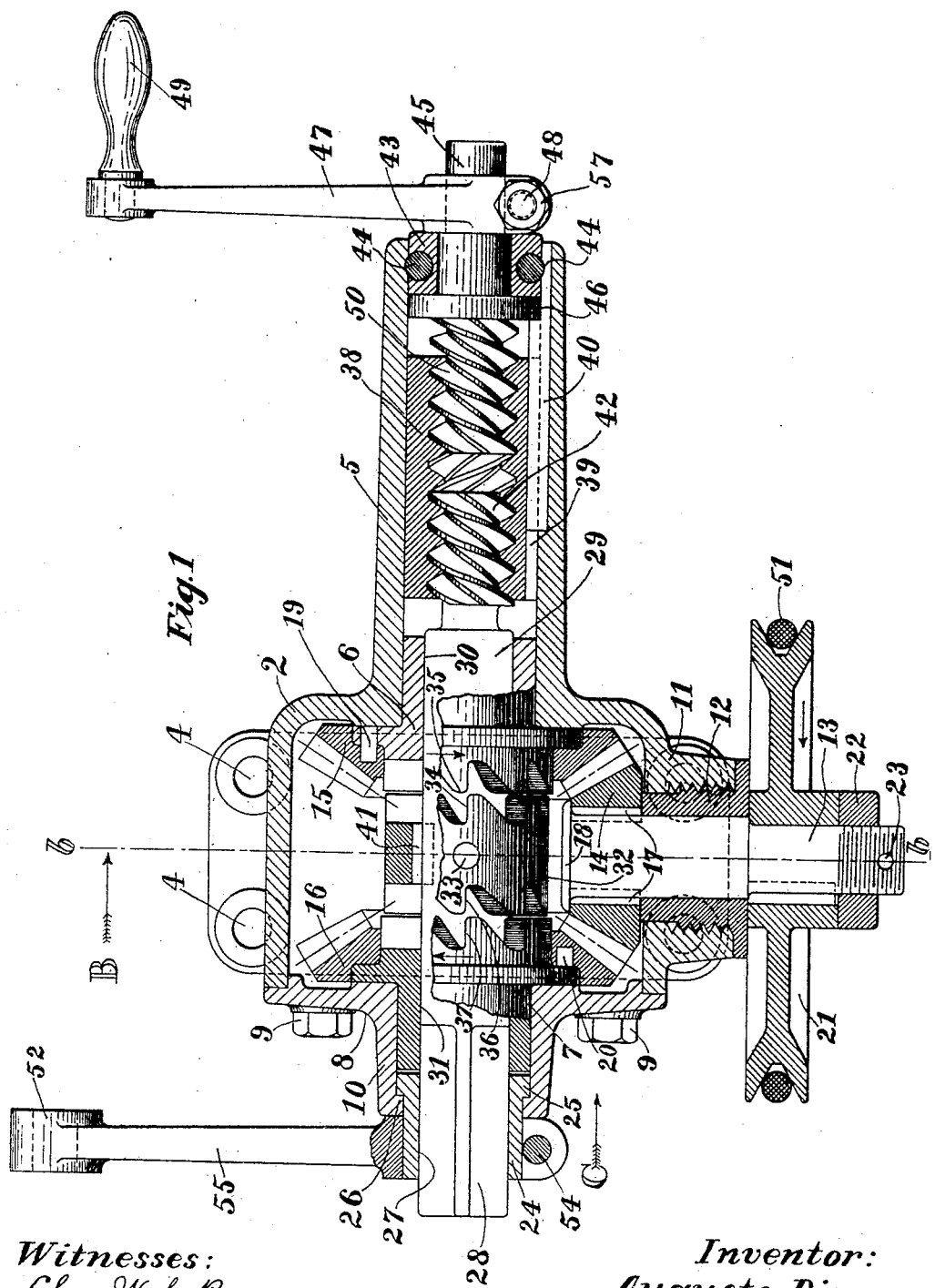
Witnesses:
Chas. W. LaRue
James L. Corles.
Inventor:
Augusto Dina
by Wilbur M. Stone
Attorney.

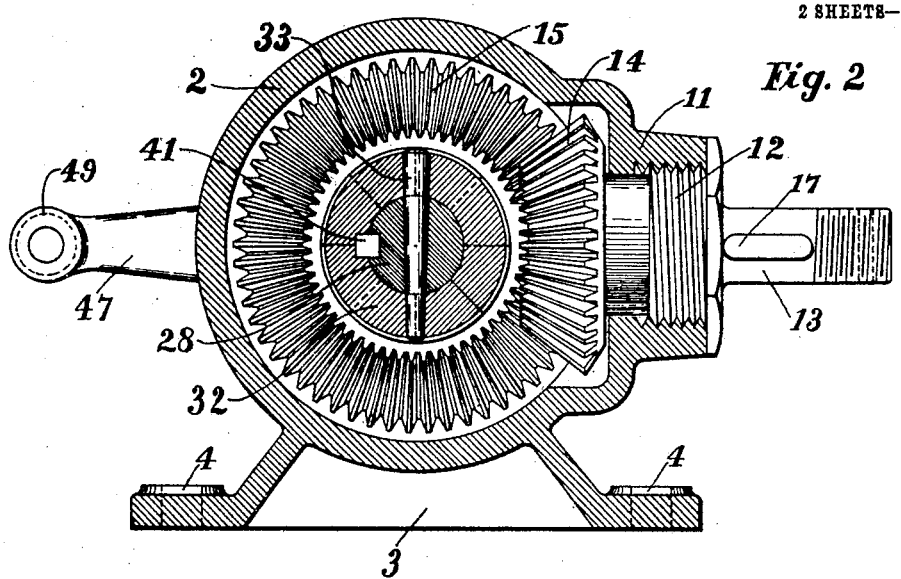
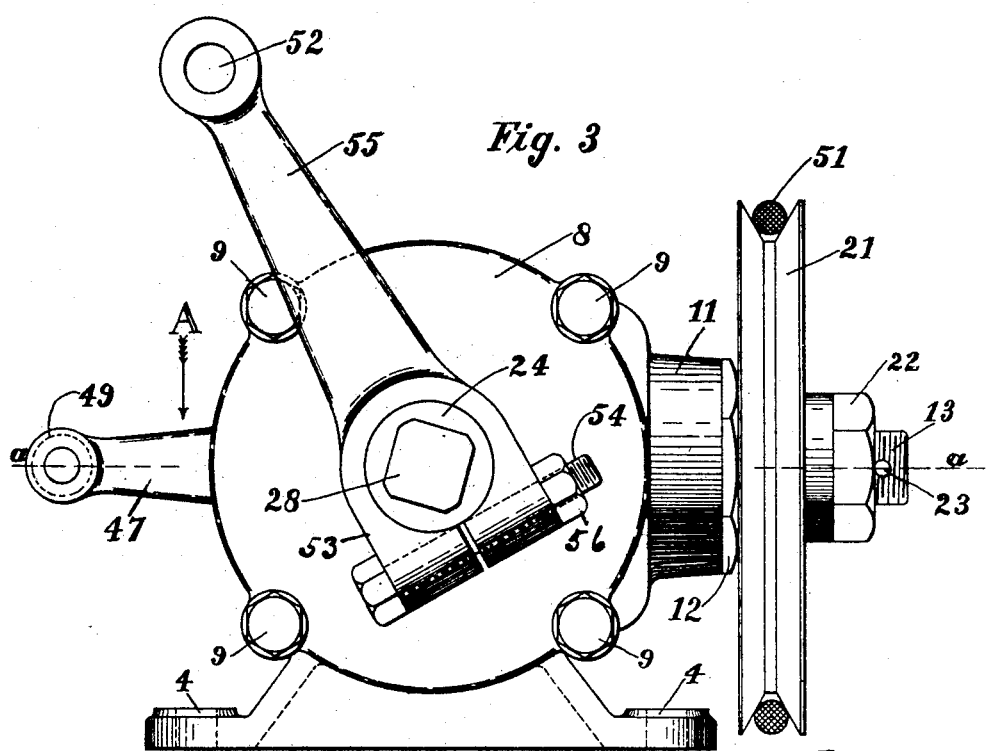

UNITED STATES PATENT OFFICE.

AUGUSTO DINA, OF WEST HOBOKEN, NEW JERSEY, ASSIGNOR OF ONE-HALF TO ALFRED ADAMSON, OF DOBBS FERRY, NEW YORK.

MECHANICAL MOVEMENT.

No. 803,565.      Specification of Letters Patent.      Patented Nov. 7, 1905.

Application filed November 25, 1904. Serial No. 234,238.

*To all whom it may concern:*

Be it known that I, AUGUSTO DINA, a subject of the King of Italy, residing at West Hoboken, New Jersey, have invented a new and useful Improvement in Mechanical Movements, of which the following is a specification.

This improvement relates to mechanical movements, and has for its object to provide simple and efficient means for transforming manually-initiated movements into power-actuated movements of corresponding direction and amount, or the mechanism may be so arranged as to transform the manually-initiated movements into power-actuated movements of opposite direction or of a predetermined greater or less amount.

My invention is also applicable to various forms of reversing mechanism other than clutch-and-gear reversing mechanism.

A further object of this improvement is to provide a self-governing power-actuated mechanism in which the actuated member will be returned automatically to its normal position whenever moved therefrom by extraneous forces.

My improvement is adapted to be used for a variety of purposes—for instance, the operating of the reversing mechanism of engines and for operating the steering mechanism of automobiles.

With these objects in view my improvement comprises in one of its embodiments, and which may be the preferred one, a mechanism illustrated in the drawings accompanying this specification.

In said drawings, Figure 1 is a plan view, largely in section, of my improved mechanism. The section of Fig. 1 is taken on line *a a* of Fig. 3 and looking in the direction of arrow A. Fig. 2 is an end elevation, largely in section, on line *b b* of Fig. 1 and looking in the direction of arrow B. Fig. 3 is an end elevation looking in the direction of arrow C of Fig. 1.

Similar characters of reference refer to like parts throughout the drawings.

The operative parts of my improved mechanism are supported by a case 2, having a base 3 convenient for attaching said case to a frame or machine in connection with which it may be desired to use my improvement. Said base is provided with the usual bolt-holes 4. Case 2 has a sleeve-like extension 5, in which is provided a bearing for clutch member 6 and for other parts to be described later herein. Said case 2 is provided with a cover or cap 8, secured thereto by bolts, as 9. Said cap 8 also has a sleeve-like extension 10, in which is provided a bearing for clutch member 7, similar to clutch member 6, but having teeth of the opposite inclination to those of clutch member 6. On one side of case 2 is another sleeve-like extension 11, similar to but shorter than sleeve 5. Into sleeve 11 is screwed a bushing 12, in which is formed a bearing for stud 13. On the inner end of said stud is mounted bevel-gear 14. Said gear is keyed to stud 13 by means of a key or keys 17. Also said stud is provided with a head 18, whereby said gear is prevented from endwise movement inwardly on the stud. Meshing with gear 14 are two bevel-gears 15 16 of equal size and carried by clutch members 6 7, respectively. Gear 15 is pinned to turn with clutch member 6 by pin 19, and gear 16 is pinned to turn with clutch member 7 by pin 20.

On the outer end of stud 13 is keyed pulley 21, and which pulley may be prevented from end movement on the stud by means of nut 22, and which nut may be itself secured against loosening by pin 23. Motion may be transmitted from pulley 21 through stud 13 to gear 14 thereon, and thence motion in one direction may be transmitted to gear 15 and its clutch member 6 and in the other direction to gear 16 and its clutch member 7.

In the outer end of sleeve 10 of cap 8 is revolubly mounted bushing 24, having a collar 25 for engagement with contracted neck 26 of sleeve 10, whereby said bushing is restrained against outward movement in said sleeve. On the outwardly-projecting end of bushing 24 lever 55 is secured by means of split hub 53 thereof and clamp-screw 54 and nut 56. Said lever 55 is provided at its outer end with an eye 52, whereby said lever may be connected to any mechanism which it may be desired to actuate by power in response to the indications of lever 47. Bushing 24 has a square hole 27 axially therethrough and in which hole is slidably mounted the squared end 28 of clutch-shaft 29. Said clutch-shaft is supported in bearings 30 31, bored axially through clutch members 6 and 7, respectively, and between said clutch members is mounted on shaft 29 a double-ended clutch member 32. This double-ended clutch member is held fast to shaft 29 by key 41 and pin 33 and is provided at one end with teeth 34 for engagement with teeth 35 of clutch member 6 and at the other end with teeth 36 for engagement with teeth 37 of clutch member 7. Double-ended clutch member 32 is preferably made with very little clearance between its ends and the respective ends of clutch members 6 and 7, so that a very slight endwise movement will cause said clutch member 32 to engage either clutch member 6 or 7. By this means motion may be transmitted in either direction to bushing 24 at will, according to the direction in which double clutch member 32 is moved. About midway the length of sleeve 5 there is slidably mounted therein a nut 38, having a screw-thread, preferably of coarse pitch, formed therein coaxial with shaft 29. Said sleeve may be prevented from rotation by a keyway 39 therein engaging with key 40, secured in sleeve 5. Key 40 is, however, so fitted in keyway 39 as to allow free endwise movement to sleeve or nut 38. Clutch-shaft 29 is provided at the inner end thereof, within sleeve 5, with a threaded portion 42 for engagement with nut 38.

Endwise movement in either direction may be communicated to nut 38 by the following means: In the outer end of sleeve 5 is mounted bushing 43, and which bushing is secured in said sleeve by means of pins 44. Revolubly mounted in said bushing is screw-shaft 45, having thereon a collar 46, abutting against the inside end of bushing 43. At the outside end of bushing 43 hand-lever 47 is clamped to screw-shaft 45 by means of clamp-bolt 48 and nut 57. Said hand-lever may also be provided for convenience with a handle 49. The inner end of screw-shaft 45 is provided with a threaded portion 50 for engagement with nut 38. Sufficient distance is provided within nut 38 and between the ends of screws 50 and 42, respectively, so that when clutch-teeth 34 and 35 are in full engagement said ends will not abut or interfere with each other. Also sufficient length of engagement is provided for screws 50 and 42 in nut 38, so that when clutch-teeth 36 and 37 are in full engagement said screws will still have a sufficient length of working engagement with said nut.

If desired, screw 42 and that part of nut 38 engaged thereby may have a different pitch from screw 50 and the part of nut 38 engaged thereby, and thus produce a movement of lever 55 greater or less, as the case may be, than the movement of lever 47. Also by reversing the lead of screws 42 and 50 and nut 38 from left hand, as shown, to right hand lever 55 may be actuated in the opposite direction to that in which lever 47 is turned. Furthermore, power may be transmitted to the mechanism through either of gears 15 or 16 instead of through gear 14. It is obvious that these changes and other changes may be made within my invention. Power may be communicated to pulley 21 by means of belt 51.

The operation of my improved mechanism is as follows: Pulley 21 being revolved in the direction of the arrow thereon, gear 14 on stud 13 thereof will be revolved in the same direction, and gears 15 and 16 will be revolved in the directions of their respective arrows. Clutch members 6 and 7 will therefore be revolved in opposite directions corresponding with the direction of rotation of their respective gears. If now lever 47 be turned downwardly, Fig. 2, by means of handle 49 screw-shaft 45 will be rotated in its bearing and screw 50 will be turned in nut 38. As nut 38 is held against rotation by key 40, said nut will therefore be moved endwise toward the left hand, Fig. 1, as said screw and nut have left-hand threads. Nut 38 in its movement to the left will push clutch-shaft 29 with it by means of the engagement of the threaded portions of that shaft and that nut, respectively. Said shaft will therefore slide axially in its bearings 30 31 in clutch numbers 6 7, respectively, and the squared end 28 of said shaft will slide axially in squared hole 27 of bushing 24. This endwise movement to the left of said shaft will promptly force teeth 36 of clutch member 32 into engagement with teeth 37 of clutch member 7, and which engagement will immediately cause clutch member 32 to be revolved by clutch member 7. Said clutch member 32 being keyed and pinned to clutch-member shaft 29 will therefore cause that shaft, and through the squared end 28 thereof, in engagement with bushing 24 and lever 55 to revolve a like amount. Said revolution of shaft 29 will also cause threaded portion 42 thereon to screw into nut 38, whereby clutch member 32 will thereupon be automatically withdrawn from engagement with clutch member 7 after having been revolved thereby an angular distance substantially equal to the angular distance through which lever 47 was turned. The angular movement of lever 55 will be slightly less than the angular movement of lever 47, because of the slight lost motion of clutch member 32 in passing into engagement with clutch member 7. If now lever 47 be moved upwardly back to its original position, nut 38 will be drawn toward the right hand, Fig. 1, shaft 29 and clutch member 32 traveling therewith, and said clutch member will pass into engagement with clutch member 6 and with lever 55 be thereby rotated in the direction of the arrow on clutch member 6. This revolution will continue until threaded portion 42 of shaft 29 unscrews a sufficient amount from nut 38 to move clutch member 32 out of engagement with clutch member 6 and at which time said clutch member 32, shaft 29, bushing 24, and lever 55 will have been rotated to substantially their original positions. Again, if lever 47 be moved upwardly from its original position, as shown in the drawings, nut 38, shaft 29, and clutch member 32 will be drawn toward the right hand, Fig. 1, and said clutch member thereby forced into engagement with clutch member 6. This engagement will cause said clutch member 32, shaft 29, bushing 24, and lever 55 thereon to be revolved until the threaded portion 42 of said shaft shall have backed clutch member 32 out of engagement with clutch member 6 and at which time lever 55 will have been moved an angular distance upward to the right, Fig. 3, substantially equal to the angular distance through which indicator-lever 47 was moved and automatically returned to its initial position. The automatic or self-governing operation of my improved mechanism is as follows: If, lever 47 being at rest, lever 55 be moved by hand or otherwise to the right, Fig. 3, for instance, it will, through bushing 24 in engagement with squared end 28 of shaft 29, screw the threaded portion of said shaft outwardly or to the left hand, Fig. 1, in nut 38, thereby moving clutch member 32 on said shaft into prompt engagement with clutch member 7, whereby said shaft, bushing 24, and lever 55 will be moved backwardly to their original positions. Again, if said lever 55 be moved downwardly to the left, Fig. 3, clutch member 32 will be moved into engagement with clutch member 7, and lever 55 will be promptly restored to its original position. It will thus be seen that any extraneous influences tending to move lever 55 from its normal position will be promptly met and counteracted automatically by the mechanism.

I claim—

1. The combination in clutch-reversing mechanism with a slidable clutch member, of means synchronously slidable and rotatable coaxial with said slidable clutch member for automatically returning said slidable clutch member to its idle position when moved therefrom, all combined and operating together substantially as described.

2. The combination in power-driven clutch-reversing mechanism with a slidable double-ended clutch member, of means synchronously slidable and rotatable coaxial with said slidable clutch member for automatically returning said slidable clutch member to its idle position when moved therefrom, all combined and operating together substantially as described.

3. The combination in a gear-and-clutch reversing mechanism with a slidable clutch member, of a reciprocatable nut, a screw in engagement with one end of said nut for reciprocating the same and a screw on the clutch member in engagement with the other end of said nut for reciprocation thereby, all combined and operating together substantially as described.

4. The combination of a pair of oppositely-disposed clutch members, means for rotating them in opposite directions, a double-ended clutch member between said oppositely-disposed clutch members for engagement with either thereof, means coaxial with said clutch members for moving said double-ended clutch member into engagement with either of the oppositely-disposed clutch members and means also coaxial with said clutch members for automatically removing said double-ended clutch member from engagement therewith, all combined and operating together substantially as described.

5. The combination of a pair of oppositely-disposed clutch members 6, 7, means for rotating them in opposite directions, a double-ended clutch member disposed between said clutch members for engagement with either thereof, a slidable nut 38, an actuating-screw 45 for engagement therewith, said double-ended clutch member having a threaded extension for engagement with the slidable nut, all combined and operating together substantially as described.

6. The combination in power-driven clutch-reversing mechanism with oppositely-disposed clutch members rotatable in opposite directions, a slidable double-ended clutch member between said oppositely-disposed clutch members for engagement therewith, of means synchronously slidable and rotatable coaxial with the clutch members for automatically releasing said double-ended clutch member from engagement with either of said oppositely-disposed clutch members whenever the double-ended clutch member is in engagement therewith.

7. The combination of opposite clutch members 6, 7, bevel-gears 15, 16 thereon respectively, bevel-gear 14 in engagement with gears 15, 16, double clutch member 32 for engagement with clutch members 6, 7, slidable nut 38, actuating-screw 45, threaded member 42 on clutch member 32 in engagement with nut 38, all combined and operating together substantially as described.

8. The combination, with power-actuated reversing mechanism, of means for communicating to said mechanism from hand-initiated movements, power-actuated movements corresponding in direction and amount with the hand-initiated movements.

9. The combination, with gear-and-clutch power-actuated reversing mechanism, of means for communicating to said mechanism from hand-initiated angular movements power-actuated angular movements corresponding in direction with, and proportionate in amount to the hand-initiated angular movements.

10. The combination with power-actuated reversing mechanism of means comprising a slidable nut 38, actuating-screw 50 and actuated screw 42 for communicating to said mechanism from hand-initiated movements, power-actuated movements corresponding in direction and intensity with the hand-initiated movements, all combined and operating together substantially as described.

Signed this 18th day of November, 1904, at 2512 Park Row Building, New York city, in the presence of two subscribing witnesses.

AUGUSTO DINA.

Witnesses:
WILBUR M. STONE,
CHAS. W. LARUE.